UNITED STATES PATENT OFFICE.

EINAR MORTERUD, OF TORDERÖD, NEAR MOSS, NORWAY.

PROCESS FOR THE MANUFACTURE OF CELLULOSE.

1,299,597.

Specification of Letters Patent. Patented Apr. 8, 1919.

No Drawing. Application filed December 6, 1918. Serial No. 265,553.

*To all whom it may concern:*

Be it known that I, EINAR MORTERUD, a subject of the King of Norway, of Torderöd, near Moss, Norway, have invented certain new and useful Improvements in Processes for the Manufacture of Cellulose; and I do hereby declare the following to be a full, clear, and exact description of the invention, such as will enable others skilled in the art to which it appertains to make and use the same.

This invention relates to the manufacture of cellulose according to the sulfite method.

In the manufacture of cellulose by digesting wood and other vegetable matter in a sulfite liquor, the digestion liquid cannot be preheated to a temperature beyond 40° C. Heating the liquid above this temperature involves the escape of free sulfurous acid if the liquid is not inclosed in a vessel sustaining a pressure above that of the atmosphere. Even when this latter measure is made use of the sulfurous acid gas will however be expelled on passing digestion liquor from the said closed vessel through a closed conduit in a closed digester charged with wood chips. It is from this reason not practicable to preheat this digestion liquid by the means now usually employed in connection with the introduction of the required chemicals into the digester.

According to the present invention these difficulties are overcome in the manner, that the digestion liquid—which has hitherto been used in the form of a highly diluted solution of the required sulfurous acid compounds with sulfurous acid—is supplied to the digester in a much higher degree of concentration than hitherto employed and at such a low temperature that the gas is retained therein. The deficiency in liquid may then be supplied in the form of pure water, waste liquor from a preceding digestion operation or the like, which can be heated to a high temperature without thereby undergoing any chemical or physical alteration.

Supposing as an example a digester taking normally a charge of digestion liquid of 100 m³ with about 3 per cent. free and about 1 per cent. combined sulfurous acid then this liquid cannot be introduced into the digester with a higher temperature than about 40° C. Supposing that a less quantity of digestion liquid be employed for instance 50 m³, which is prepared and supplied to the digester with a content of 6 per cent. free and 2 per cent. of combined sulfurous acid the charge will contain the same quantity of chemicals.

The deficient quantity of liquid may then be introduced into the digester in the form of preheated waste liquor or water, the advantage referred to above being hereby attained, viz., that a great deal of the required heat could be immediately imparted to the charge of the digester. Hereby is also obtained that the heat, which after a digestion operation is available for heating purposes, is utilized in a practical and economical manner as will be further explained in the following.

The process according to this invention may for instance be carried into effect in the following manner:

When the digester has been charged with the material to be treated the digester is supplied with a strong concentrated and comparatively cold digestion liquid in a quantity which stands in a reversed ratio to the relation between the concentration of the introduced digestion liquid and the concentration which it is to have during the digestion operation. From a reservoir in which water or waste liquor is kept in a heated condition at a suitable elevated temperature and under a suitable pressure, the digester is then supplied with such a quantity of dilution liquid that the digestion liquid attains a suitable concentration. The digestion operation is then carried into effect in the usual manner. When this operation is finished the digester is connected with the reservoir referred to, which in the meantime has been charged with cold water or cold waste liquor, and the hot gases steam and liquid is blown from the digester into the reservoir, the necessary heating of the liquid contents of the same being thereby effected.

When the digestion operation is carried out in the manner hitherto employed a mixture of gas and vapor escaping from the finished batch has to be cooled before the gas is introduced into the acid plant for absorption and preparation of fresh digestion liquid. A great deal of heat is hereby wasted. According to the present invention however this heat is now utilized to preheat digestion liquid for the next digestion operation. As a consequence of this measure a saving in apparatus is also obtained the whole large cooling plant for the escaping digester gas and steam being dispensed with.

I claim.

1. Process for the manufacture of cellulose according to the sulfite method comprising the measures of introducing the chemicals required for the digestion operation in a degree of concentration higher than required for the digestion operation and of introducing dilution liquid into the digester in the form of preheated water, waste digestion liquor or other liquid in the quantity necessary to obtain the desired acid concentration.

2. Process according to claim 1 in which the dilution liquid is preheated by means of introducing gas, steam or liquid obtained in blowing off a finished batch, into the reservoir, in which it is stored.

In testimony that I claim the foregoing as my invention, I have signed my name in presence of two subscribing witnesses.

E. MORTERUD.

Witnesses:
D. Voss,
Einar W. Diesurud.